May 23, 1972   R. A. McKNIGHT   3,664,746
HEAD POSITIONING DEVICE
Filed Aug. 19, 1970
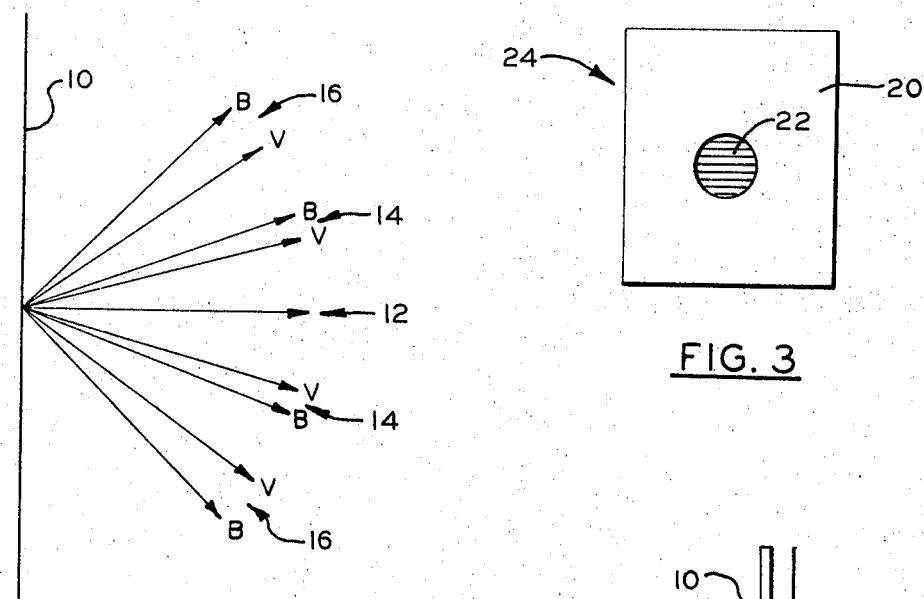
FIG. 1
FIG. 3
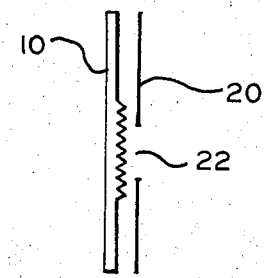
FIG. 4
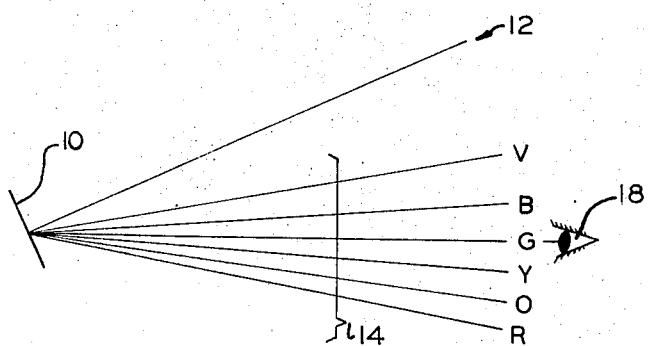
FIG. 2
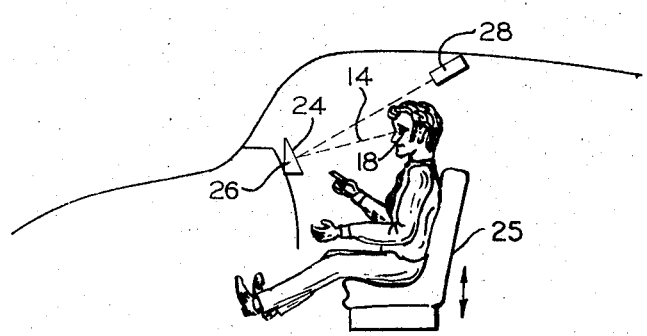
FIG. 5
Robert A. McKnight
INVENTOR.
BY Charles L. McGuire
ATTORNEY

3,664,746
HEAD POSITIONING DEVICE
Robert A. McKnight, Binghamton, N.Y., assignor to The Singer Company, New York, N.Y.
Filed Aug. 19, 1970, Ser. No. 64,949
Int. Cl. G01b 11/26
U.S. Cl. 356—138                                8 Claims

ABSTRACT OF THE DISCLOSURE

An eye positioning device which makes use of the spectral dispersion properties of a diffraction grating. The grating is placed in a position where a predetermined color of the spectrum will intersect a proper eye position and has a mask of the same color placed over it with a small opening so that an observer with his eye properly positioned will see one solid color over the surface of the device.

---

This invention relates to a head positioning device and more particularly to such a device constructed using a prism or diffraction grating.

In many situations where an observer is viewing a real world or a generated image from a particular vantage point it is important that his eye be positioned at a particular point. For example, it is desirable that each pilot, regardless of size, in a large aircraft have his eye at the same position and that an individual pilot have the same eye position each time he flies the aircraft. The present invention solves this problem in a simple and novel manner by utilizing a spectral dispersing means such as a diffraction grating or prism.

It is the object of this invention to provide an improved eye positioning device.

Another object is to provide such a device by utilizing a diffraction grating or prism.

Other objects will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawing in which:

FIG. 1 illustrates the rays emanating from a diffraction grating;

FIG. 2 illustrates the positioning of a diffraction grating for use in the present invention;

FIG. 3 is a plan view of the preferred embodiment of the eye positioning device;

FIG. 4 is an elevation view of the same embodiment; and

FIG. 5 illustrates the installation of the device in an aircraft cockpit.

Either a prism or a diffraction grating may be utilized to disperse the colors of the visible spectrum into distinct colors. The specification will concentrate on the use of a diffraction grating but it should be obvious that a prism can be used for the same purpose. A description and illustration of dispersion by a prism is contained in "Fundamentals of Optics" by Jenkins and White, second edition p. 27 et seq. (McGraw-Hill Book Company Inc., New York).

Diffraction gratings are formed by engraving a great many fine parallel lines on a flat glass plate or a reflective surface. The former forms a transmission grating and the latter a reflective grating. FIG. 1 shows a grating 10 with rays of light from a bichromatic source emanating from it. The zero order 12 will contain both the Blue color (labeled B) and the Violet color (labeled V) in one ray. However in the first order 14 and second order 16 the blue and violet are separated. Additional orders are present but not shown. A full explanation of the grating is given in "A Contemporary View of Elementary Physics" by Borowitz and Bornstein, p. 595 et seq. (McGraw-Hill Book Company, New York) and in the Jenkins and White book referenced above.

The first order will have the highest intensity and it is this order which is used in the present invention. FIG. 2 shows the grating 10 tilted so that the first order 14 is directed to a desired eye position 18. More specifically, it is directed so that the green (designated G) of the first order is pointed toward the eye position 18. It can be seen that movement of an observer eye above or below the point 18 will cause him to see a different color. Thus, by indicating the proper color to be viewed by the observer he may establish the proper eye point by adjusting his position until he sees that color.

FIGS. 3 and 4 show the grating as it is arranged for use in the present invention. The grating 10 is covered with a mask 20 having a hole 22 cut in it. This may be a paper or plastic material and will have a color the same as that to be observed by the observer in the proper position. Alternatively, this material may be paint deposited on the grating in the pattern shown. The size of the hole is such that all of the desired color, preferably green, since it forms a wide band and is near the center of the spectrum, and only that color will be seen when the observer is properly positioned. Thus the observer need only adjust his position until he sees a solid color on the total device 24. The nature of the rays of light from the grating are such that the observer must be in the proper horizontal position before he will see any light. Thus the device may be used to establish the proper position both horizontally and vertically.

FIG. 5 shows the installation of the device 24 in the cockpit of an aircraft. The eye point 18 is initially established by other means and an observer placed with his eye in that position. Device 24 is then mounted on a wedge 26 at the proper angle so that it may be fastened to a suitable position in the cockpit to place the device 24 at an angle where the observer will see the proper color. Light 28 which may possibly be one of the cockpit lights provides the necessary light source. It is only necessary that light 28 be sufficiently bright to overcome ambient conditions and that its rays be generally directed at device 24. Once the device is properly installed and positioned any observer may obtain the proper eye position by vertically adjusting his seat 25 until he sees the proper color. A type of grating which was used to test this device and which may be used is Wallaces Replica of Carnegie Institution 15,000 plane grating lines to the inch made by Central Scientific, Chicago, Ill. Less expensive gratings which should work equally well are those made by Edmund Scientific Company of Barrington, N.J. with stock numbers 41,013 through 41,048.

Although FIG. 5 shows a reflective type grating, a transmissive grating with a light located behind it could be used or, as mentioned above, a prism might be used.

It can be seen then that the present invention discloses a simple and effective device which is useful for eye positioning. Although the application described is for use in aircraft it is not the intention of the inventor to limit his invention to such use. There are many other areas where proper eye position is important and the invention should be useful in any such application.

What is claimed is:
1. The method of locating an observer's eye at a predetermined position comprising:
   (a) establishing a desired eye position;
   (b) placing a first observer with his eye at said desired position;
   (c) placing in front of said first observer an illuminated spectral dispersion means;
   (d) placing on the side nearest the observer and adjacent to said dispersion means a mask of a predetermined color having an opening therein;
   (e) adjusting and securing said dispersion means so that said first observer sees said predetermined color on the surface of said mask and at the opening in said mask;
   (f) measuring the horizontal distance from said first observer to said dispersion means;
   (g) placing another observer at said distance; and
   (h) adjusting said another observer's vertical eye position to a position where he sees on the surface of the opening in said mask as he sees on the surface of the mask.

2. The method according to claim 1 wherein said distance from said dispersion means is established by a seat located at said distance.

3. The method according to claim 2 wherein said vertical head movement is accomplished by adjusting said seat.

4. The method according to claim 1 and further including the step of determining the size opening which will permit only said predetermined color to be visible when viewed from said proper eye position and making said opening of a size equal or less than said determined size.

5. Apparatus to establish a predetermined eye position comprising
   (a) an adjustable seat establishing the general area of said eye position;
   (b) illuminated spectral dispersion means placed in front of said seat and secured so that light of a predetermined color intersects said predetermined eye position, and
   (c) a mask placed between said eye position and said dispersion means, said mask having an opening of a size to permit all the ray of said predetermined color and only said color to pass, and having a color on its surface the same as said predetermined color whereby an observer seated in said seat may adjust said seat to a position where he will see the same color at the opening of said mask as he sees on the surface of said mask thus establishing said predetermined eye position.

6. The invention according to claim 5 wherein said spectral dispersion means is a diffraction grating.

7. The invention according to claim 6 wherein said grating is of the reflective type.

8. The invention according to claim 6 wherein said grating is of the transmissive type.

References Cited

UNITED STATES PATENTS

| | | | |
|---|---|---|---|
| 3,541,503 | 11/1970 | Stiles | 356—172 |
| 3,495,908 | 2/1970 | Rea | 356—153 |
| 3,572,942 | 3/1971 | Tekronnie | 356—138 |

OTHER REFERENCES

J. L. Reynolds: "Color Sensitive Light Pen," IBM Tech. Discl. Bul., vol. 12, #11, April 1970, pp. 1960–1961.

RONALD L. WIBERT, Primary Examiner

J. ROTHENBERG, Assistant Examiner

U.S. Cl. X.R.

33—46 AT; 116—124; 350—168, 172

UNITED STATES PATENT OFFICE
CERTIFICATE OF CORRECTION

Patent No. 3,664,746        Dated May 23, 1972

Inventor(s) Robert A. McKnight

It is certified that error appears in the above-identified patent and that said Letters Patent are hereby corrected as shown below:

Claim 1 paragraph (h) should read as follows:

(h)   adjusting said another observer's vertical eye position to a position where he sees the same color at the opening in said mask as he sees on the surface of the mask.

Signed and sealed this 12th day of September 1972.

(SEAL)
Attest:

EDWARD M. FLETCHER, JR.
Attesting Officer

ROBERT GOTTSCHALK
Commissioner of Patents